Aug. 22, 1939.  W. T. SULLIVAN  2,170,770
SHUTTLELESS LOOM
Filed Oct. 14, 1938  9 Sheets-Sheet 5
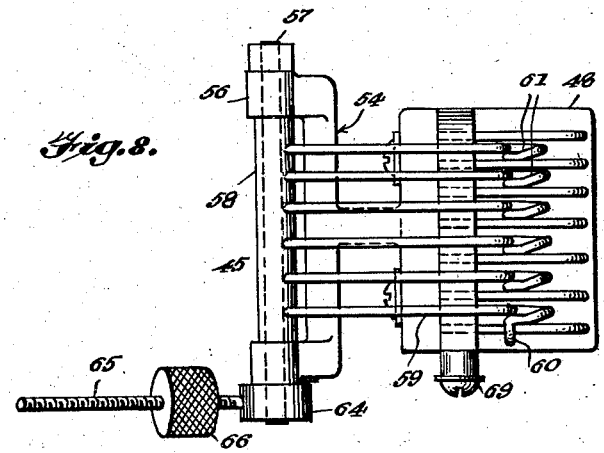
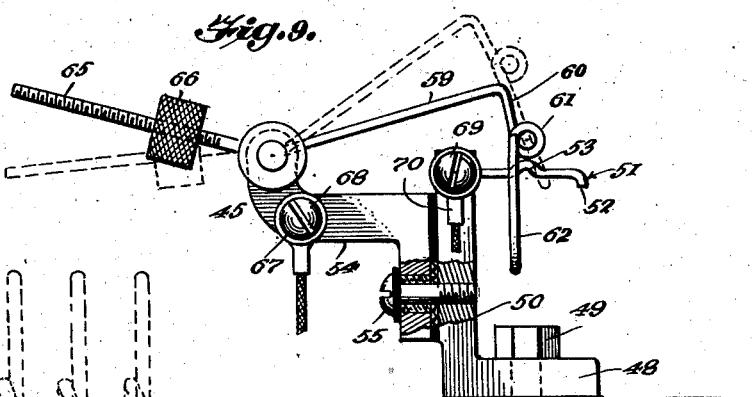
Inventor,
WOODRUFF T. SULLIVAN.

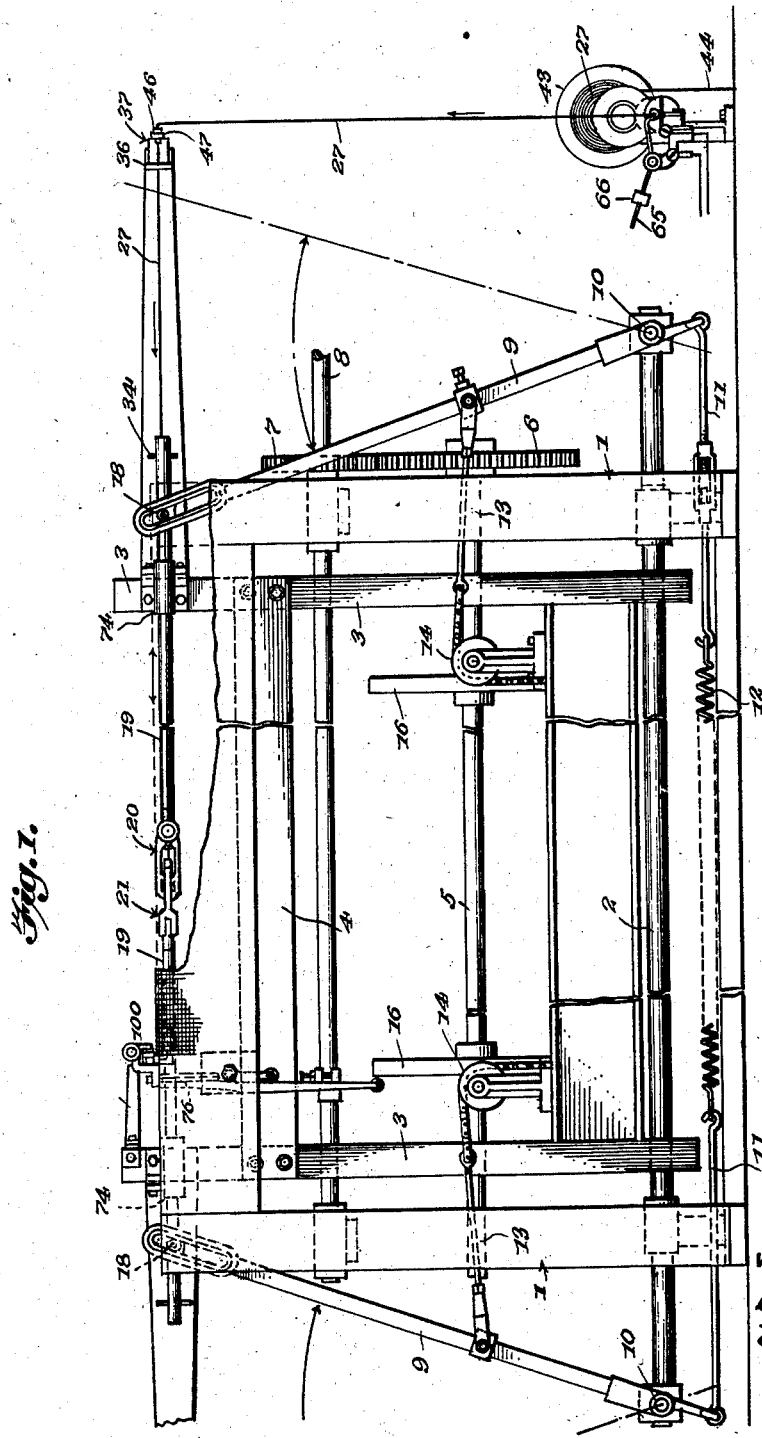

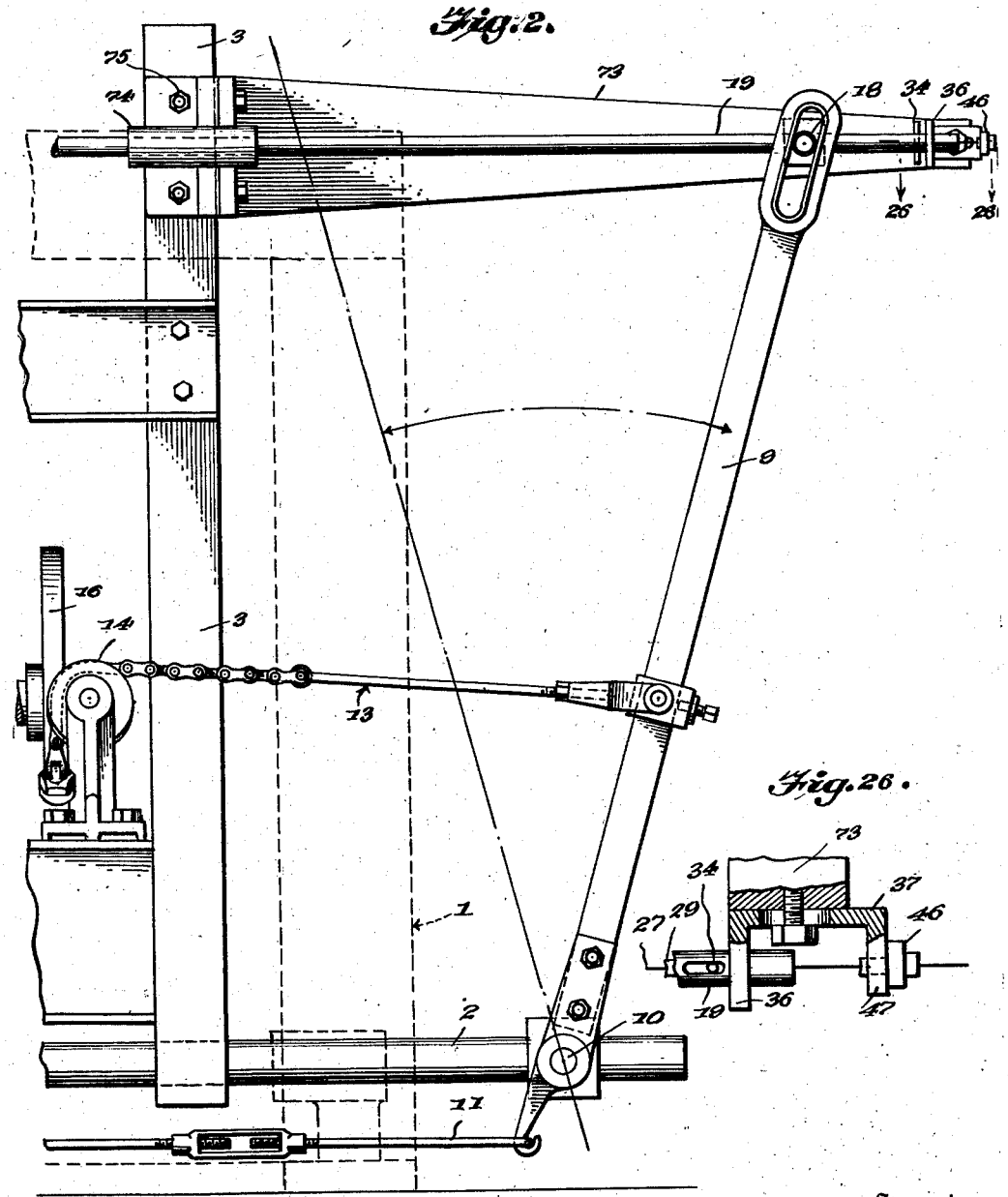

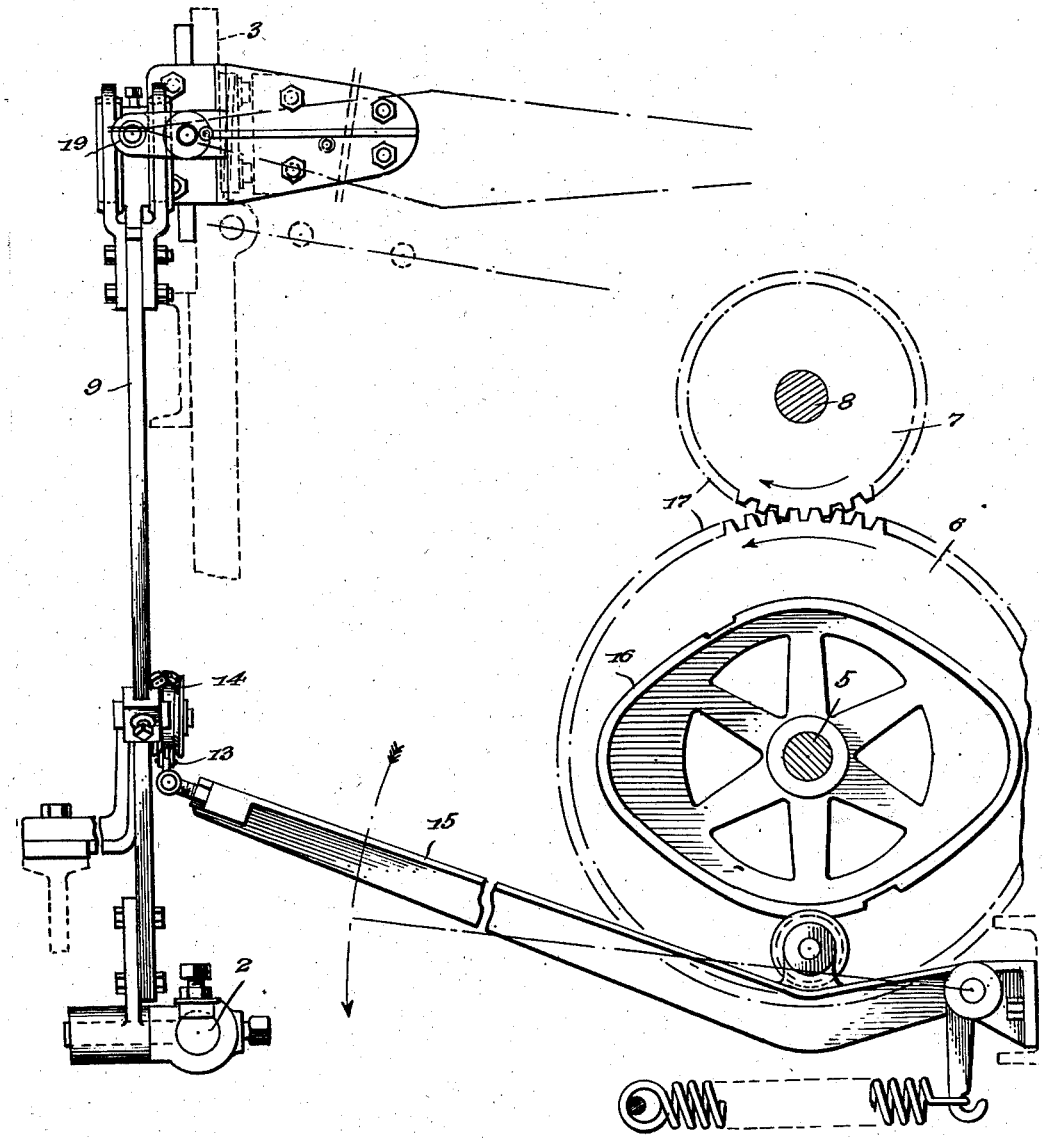

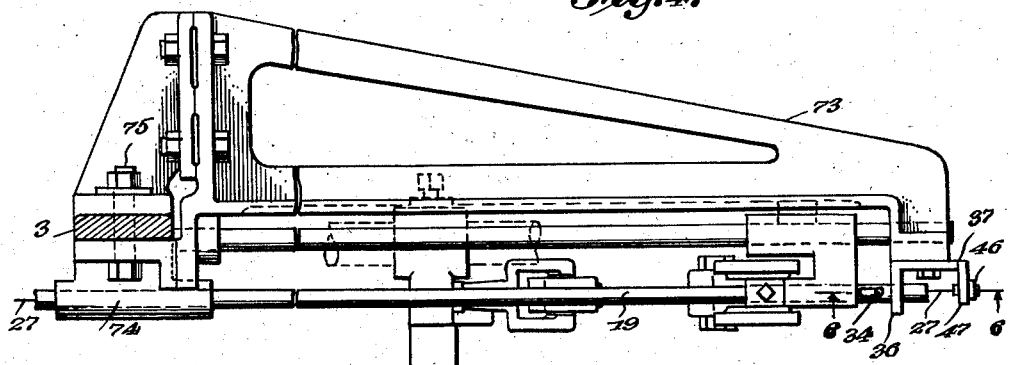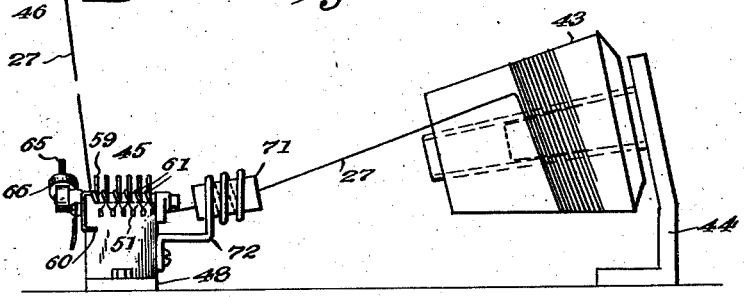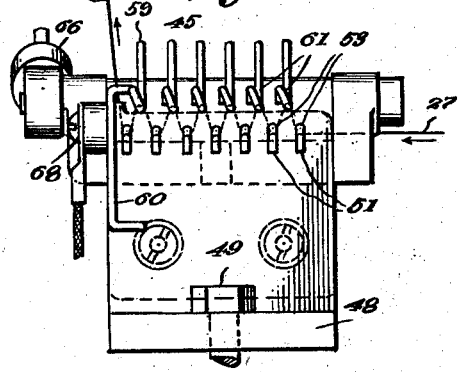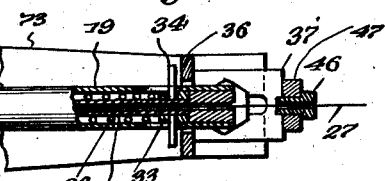

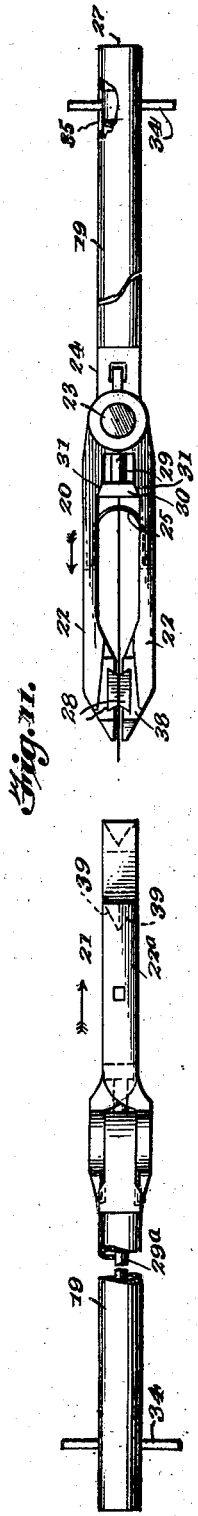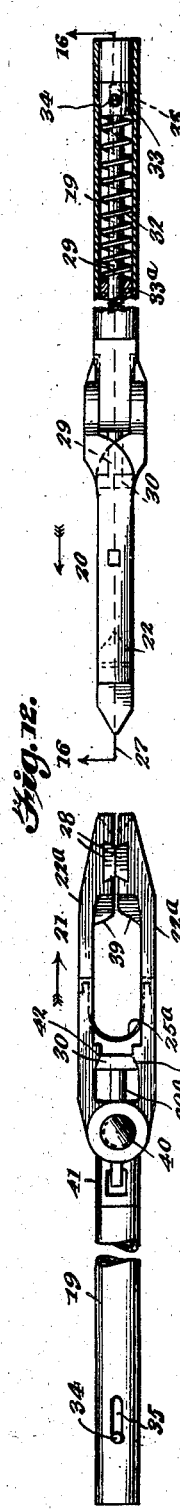

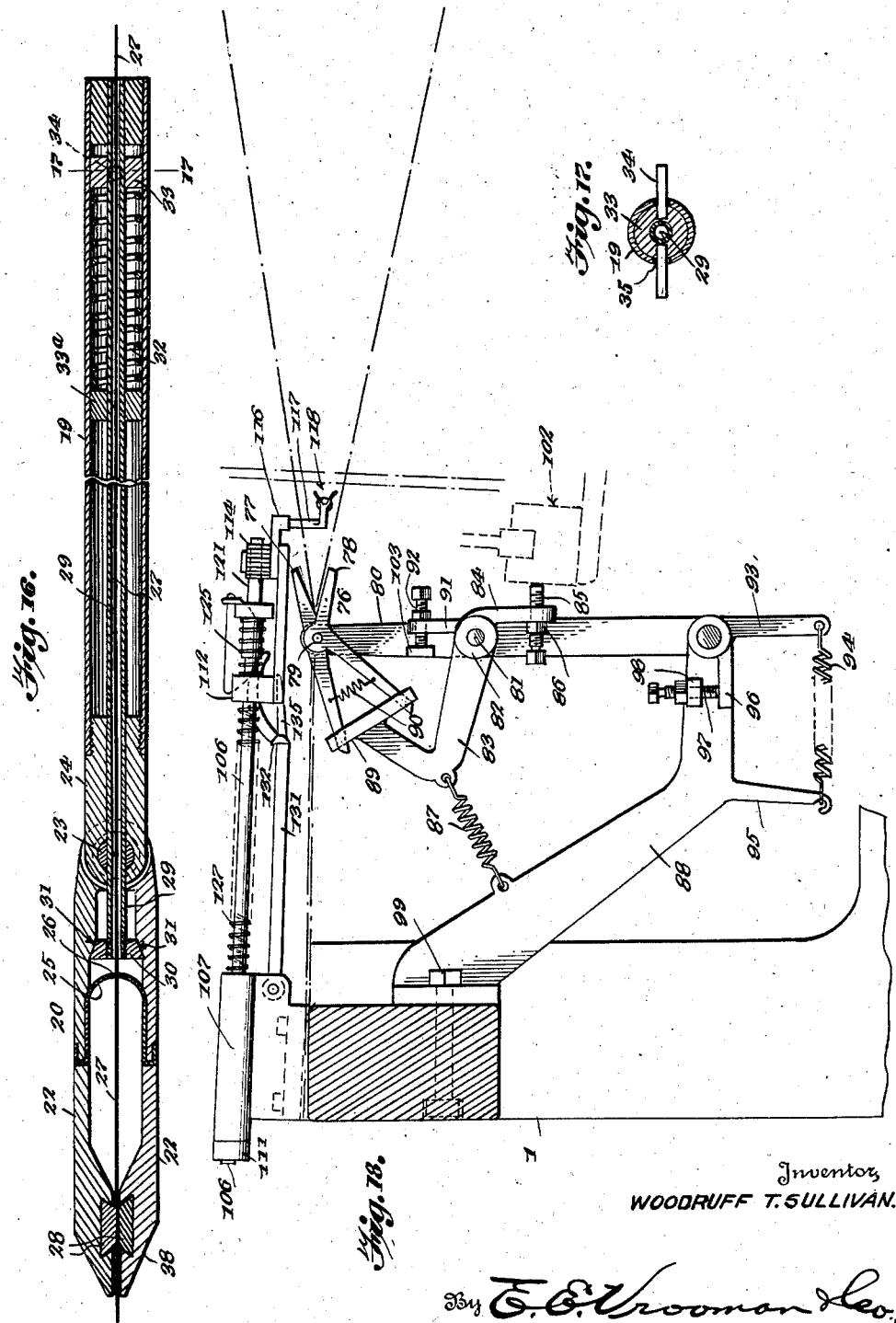

Aug. 22, 1939.  W. T. SULLIVAN  2,170,770
SHUTTLELESS LOOM
Filed Oct. 14, 1938   9 Sheets-Sheet 8

Inventor,
WOODRUFF T. SULLIVAN.

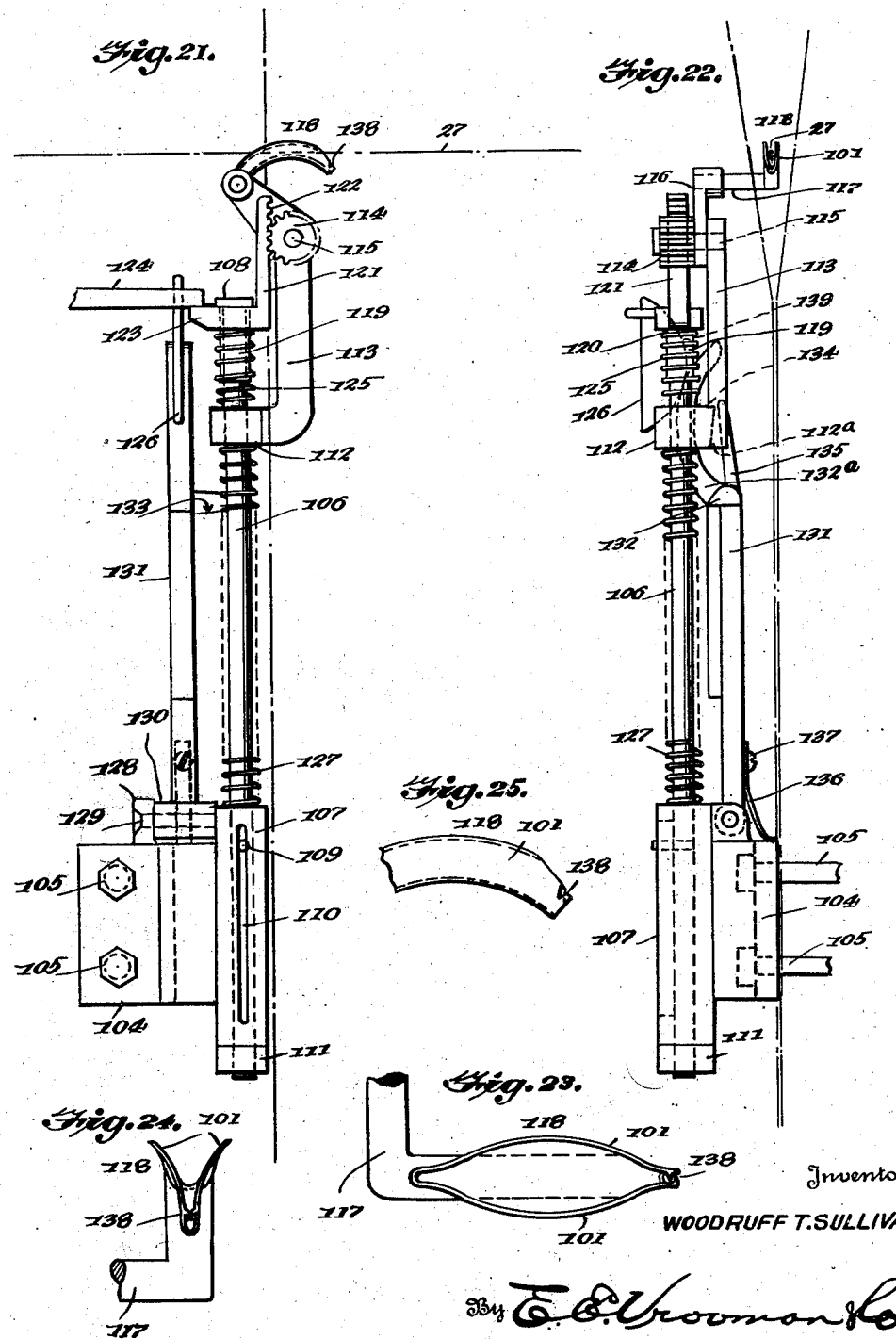

Patented Aug. 22, 1939

2,170,770

UNITED STATES PATENT OFFICE 2,170,770

SHUTTLELESS LOOM

Woodruff T. Sullivan, Norwich, Conn.

Application October 14, 1938, Serial No. 235,044

17 Claims. (Cl. 139—127)

This invention relates to improvements in shuttleless looms.

The object of this invention is to enable the production of woven fabrics of a better quality and at a reduction in cost. This is accomplished by the discarding of the time honored shuttle and substituting for this type of weft carrier a system wherein the weft supply is located extraneous to the shuttle and loom, thus allowing a much larger source of supply than the necessarily small shuttle is capable of containing. The magnitude of the supply enables the practically continuous operation of the loom, thus eliminating the necessity of any complicated, costly and troublesome automatic shuttle changing feature. Because of the fact that a shuttle or shuttles are not necessary many disadvantages of shuttle operation are eliminated, such for instance as filling breakage on the shuttle quill or in the box, or the necessary complicated shuttle tension devices within the shuttle which it is impossible to duplicate in different shuttles. One tension on the filling would act at all times, and for every pick resulting in a constant operating condition which in turn reflects itself in the quality of the fabric. Due to the operating characteristics of the filling inserting carrier there is a more favorable tension condition on the weft than is possible with shuttle operation wherein there is a sudden yank or pull on the filling when the slack is taken up after the shuttle has entered the shed.

Another important object is the location of a filling drop wire or system which will operate to stop the loom in case there is a notable lessening of tension on the filling at any time, or that the same should break. As soon as there is an appreciable lessening of tension in the filling the loom would be stopped through the filling stop motion feature. This would tend to eliminate the possibility of broken picks which condition is not ordinarily solved. Regulation of filling tension would be possible so that tension at all times is constant with the result that every pick is inserted under identical conditions resulting in a more uniform weave.

Among other objects of this invention are the elimination of the expense, relative to repair parts, such as picker sticks, picker straps, pickers, box parts, such as binder springs, swells, etc., which amount to a considerable repair and upkeep expense.

Another object of this invention is the elimination of the necessity of the severe shock transmitted to the loom proper and consequent vibration caused by the necessarily heavy strain due to the picking force required to operate the picker sticks. This should be of distinct advantage especially when pile fabrics are considered, because the pile would be cut under more favorable cutting condition, namely less vibration.

In the shuttle operating type of loom it is necessary to provide protection in the form of a dagger and dagger bumper. Should a shuttle fail to traverse the shed and reach its box in the correct manner the dagger operates to bump the loom off or stop the same, and prevent the shuttle from damaging the shed at the beat up position. With the shuttleless invention hereinafter specifically described there is little necessity for shuttle protection as the weft inserting jaws are mechanically operated and at no time should be in a position to damage the warp threads. This eliminates the costly, bothersome and complicated protecting system and further simplifies the loom operation and maintenance.

The elimination of cop or quill winding and the substitution therefore of cone winding should result in a very considerable lower operating cost as well as investment.

Due to the system of a continuous supply of weft the necessity of filling mixing is not so requisite, because of a small and varying source such as is supplied by a shuttle system is not present.

The novel arrangement of the inserting tubes, which does not require an outer bearing for the tubes, eliminates the necessity of much longer inserting tubes, thus conserving floor space and enabling the device to operate in a much more restricted area. The particular construction of the tube equalizer also insures much smoother operation by minimizing any whipping of the inserting device which might occur and consequently assuring satisfactory transfer of the filling from one set of jaws to the other at the time of transfer.

This method of filling insertion does not require a filling carrier of the proportions of the usual shuttle filling carrier. The size of the carrier or filling inserter is practically independent of the size of the filling and allows, especially in coarse work, the possibility of a somewhat smaller warp shed to work in.

With the foregoing and other objects in view, the invention comprises certain novel constructions, combinations and arrangements of parts as will be hereinafter fully described, illustrated in the accompanying drawings, and more particularly pointed out in the appended claims.

In the drawings:

Figure 1 is a fragmentary view in elevation of a shutteless loom constructed in accordance with this invention.

Figure 2 is an enlarged fragmentary view of the right end of the loom as shown in Figure 1.

Figure 3 is an enlarged rear view of the gripping device operating lever, shown in Figure 2, together with a fragmentary view of the operating means for the lever.

Figure 4 is an enlarged fragmentary view of the end of the loom, showing particularly a bracket carrying the gripping device supporting tube.

Figure 5 is a view in elevation of the large filling carrying cone and the tension device of the loom.

Figure 6 is an enlarged sectional view taken on line 6—6 Figure 4, looking in the direction of the arrows.

Figure 7 is an enlarged, side elevation view of the tension device, while

Figure 8 is a top plan view of the same.

Figure 9 is a view in front elevation of the tension device.

Figure 10 is an enlarged fragmentary view of the tension device.

Figure 11 is an enlarged view of the gripping devices, showing the retrieving gripping device and the inserting gripping device both in side elevation.

Figure 12 is an enlarged view of the gripping devices, showing the retrieving gripping device and the inserting gripping device both in top plan.

Figure 13 is an enlarged view of the gripping devices in their interlocking position.

Figure 14 is an enlarged view of the gripping devices, showing same when the retrieving device has gripped the filling and is moving outward from within the inserting device.

Figure 15 is an enlarged view showing the retrieving device as it appears when moving away from the inserting device; the inserting device in this position having its jaws open, as shown in Figure 14, allowing the filling to be freely pulled across the remaining width of the shed.

Figure 16 is an enlarged sectional view taken on line 16—16, Figure 12, and looking in the direction of the arrows.

Figure 17 is a sectional view taken on line 17—17, Figure 16.

Figure 18 is a fragmentary view in elevation of the loom, showing particularly the filling cutter or scissor device, in conjunction with the looper device.

Figure 19 is a fragmentary view in elevation of the loom, showing particularly the shed, the looper device, the retrieving jaw (in dotted lines), etc., while

Figure 21 is an enlarged fragmentary view of the loom, showing particularly in plan view the looper device, while Figure 22 is an edge view of the same.

Figure 23 is an enlarged elevated view of the looper jaws, while

Figure 24 is an end view of the same.

Figure 25 is a fragmentary view in side elevation of the looper jaws.

Figure 26 is an enlarged sectional view taken on line 26—26, Figure 2, and looking in the direction of the arrows.

Figure 19:
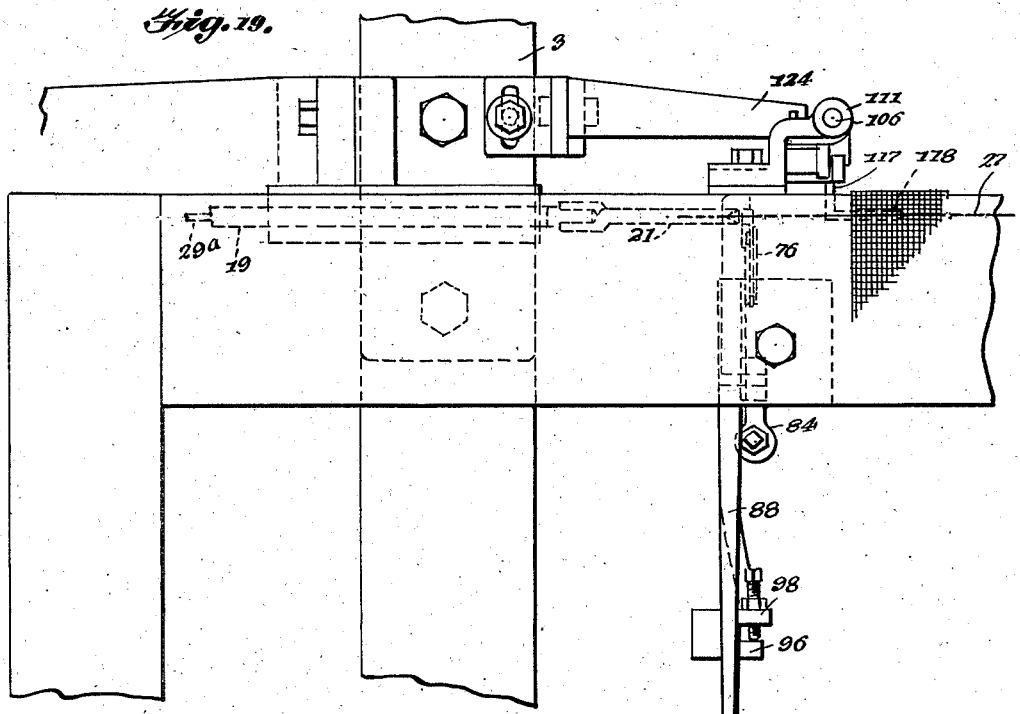

Referring to the drawings, in which I have shown the preferred embodiment of the loom, the frame 1 has the rocker shaft 2 journalled thereon, and on shaft 2 are mounted the lay swords 3. These lay swords 3 carry the lay and/or reed holder 4. On the shaft 5 is mounted a large gear 6, which gear 6 is driven by the pinion 7; pinion 7 is mounted on the crank shaft 8 and is driven in the usual manner of looms. The gripping devices operating levers 9 are pivotally mounted at 10 upon the rocker shaft 2. Rods 11 are connected at their outer ends to the lower ends of levers 9, and the inner ends of the rods 10 are connected by the coil spring 12. Connecting devices 13 are attached at their outer ends to levers 9, and pass over rollers 14. The inner end of each of the connecting devices 13 is connected to an arm 15 (Figure 3), and this arm 15 is actuated by a cam member 16 through suitable gearings 17, dotted line. Each lever 9 is slotted at is upper bifurcated end (Figs. 1 and 2) and in this bifurcated end is the operating tube collar roll 18, which is carried by the operating tube 19; the collar roll extends into the slotted portion (Fig. 1). On the inner end of the right hand operating tube 19 is mounted the inserting gripping device 20, and on the inner end of the left hand operating tube is mounted the retrieving gripping device 21. The swinging of the levers 9 cause operation of the gripping devices 20 and 21, as hereinafter specifically described. It is to be understood that upon rotating shaft 8 the lay structure 3 and 4 will oscillate to and fro around the center of rocker shaft 2 in the usual manner. It is to be understood that upon rotation of shaft 8 (Figure 3), through the gearings 17, cam units 16 will be operated which causes arm 15 to be pressed downward resulting in a pull on the connecting means 13, thereby actuating the lever in one direction. Then, as rotary movement of the cam 16 continues, spring 12 will exert a pulling action on each lever, resulting in moving the levers outwardly with respect to their upper ends. This structure and operation will be clearly appreciated upon referring to Figs. 1 and 3. In operation, the movement of the levers 9 and the operating tubes 19 is rapid, for producing a highly efficient weaving action.

The inserting gripping device 20 comprises a pair of jaws 22 pivotally connected at 23 upon a plug 24 (Figure 16), detachably secured to the inner end of the operating tube 19. A substantially U-shaped spring 25 is secured to the inner faces of jaws 22, and this spring is provided with an aperture 26 through which the filling 27 passes. On the inner faces of jaws 22 and near their outer ends, are two small blocks 28, preferably formed out of rubber. These rubber blocks 28 are provided for efficiently gripping the filling 27. An inner tube 29 is within the tube 19 and on the inner end of tube 29 is a cam plug 30. This cam plug 30 works on inclined surface 31 of jaws 22 to hold the jaws open, as clearly shown in Figure 14. This is accomplished by coil spring 32, which presses at its outer end against sliding block or plug 33. Plug 33 is provided with a transverse pin 34 (Figure 12), which works in slots 35 of the tube 19. The spring 32 acts when the jaw is open, because it normally is in a compressed position between the inner collar 33a, fastened to the tube 19, and the other plug 33 which last is fastened on tube 29. Note that the jaws 22 are not opened by the cam plug 30, but are opened by the retrieving jaws 22a of 21, because of the splitting action of the cam surfaces 29 acting on the corresponding inner cam surfaces of the inserting jaws 22 when the jaws move in opposite direction after having assumed the interlocked position. The cam 30 of the inserting device 20 does not operate until jaws 22 are opening after the interlocking position. It will be understood that jaws 22 of the inserting device 20 remain closed until after the interlocking position, as they have to position the filling so that it may be grasped when the jaws interlock, consequently cam plug 30 cannot act when the jaws are closed due to the action of spring 25. In other words, spring 32 is not strong enough to actuate plug 30 against spring 25, but when jaws 22 are opened, by the action of the retrieving jaws, as explained above, the plug 30 is forced back by spring 32 action to hold the jaws 22 open. The jaws 22 are provided on opposite sides with bevelled portions 38 which permit jaws 22a of the gripping retrieving device 21 to easily slide over, into the interlocking position as shown clearly in Figure 13. The two bevelled portions 38, on each side of jaws 22 converge towards their inner ends, whereby the jaws 22a are assured of centralizing themselves with respect to the jaws 22 as they pass over the jaws 22 and thus locate themselves in a favorable position to grasp the filling; as has been explained previously, the retrieving jaws open the inserting jaws upon reversal of motion. The filling is clamped in the jaws of both devices, inserting and retrieving, until reversal of motion takes place, at which time the filling is released from the inserting jaws when they are opened by the reversal movement of the retrieving jaws. The retrieving device 21, of the gripping devices, has spring 25a therebetween, this spring performing the same function as spring 25 on jaws 22. Rubber blocks 28 are also placed on jaws 22a and perform the same function as the gripping blocks do on jaws 22. Jaws 22a are provided with double bevelled portions 39 and 38 which quickly "split" the jaws 22 for causing said jaws to readily assume their open position (Figure 14). The jaws 22a are pivotally mounted at 40 on the plug 41 carried by the other operating tube 19, at the left of Figure 1. An inner tube 29a is in the left hand tube 19 with a cam plug 30 on its inner end, which cam plug 30 engages the cam surface 42 on jaws 22a. The inner tube 29a is furnished with pin 34, similar to the pin 34 of the inserting device 20, and this pin 34 of the retrieving device slides in slots 35 the same as the pin of the inserting device. The action of the cam 30 in the retrieving device 21 is dissimilar from that of the cam in the inserting device 20, in that in the latter when the pin 34 is acted upon by the bracket 36 it (after the jaws are opened and are being held open by cam 30) causes the cam to release and close the jaws 22 upon the filling, while in the retrieving device 21, when the jaws are closed and have drawn the filling the rest of the way through the shed and the looper has operated and the filling has been cut off near the jaws, then the contact of the pin 34 against the bracket 36 causes the cam 30 in this device 21 to force the jaws 22a open momentarily, thus allowing the short piece of filling left in these jaws to fall out. As soon as the pin 34 leaves the bracket 36, the jaws close again and are ready to enter the shed for the next pick. This action is caused by the proper design of operating cam 16, Fig. 13.

The operation of the gripping devices is instantaneous, during the weaving of the fabric. It has been proven by practical demonstration that the movement of the gripping devices toward each other is very rapid at the beginning, and the movement is decidedly slower as they enter the engaging position, Figure 13, but after the retrieving device 21 has gripped the filling 27 and has moved to the separated position shown in Figure 15, then the movement is again very rapid, so that the directing of the filling across the shed is very rapid. It is, therefore, to be understood that in this novel process of weaving, the filling is directed from the right hand edge of the fabric being woven by the inserting device to approximately the middle of the shed and thence the filling is taken from the inserting device by the retrieving device, and drawn across to the opposite edge of the shed. By reason of the operation of two devices for inserting the filling working concurrently, the rapidity of inserting the filling is greatly increased over the one style inserting methods of operation.

In supplying the filling 27 to the loom, I provide a large filling carrying cone 43 supported preferably upon bracket 44 (Figure 5). This cone 43 can carry any desired filling, and will carry a great amount of filling, producing a supply of filling far in excess of which the shuttle is capable of carrying in the ordinary loom. Therefore, it will be seen that my loom will operate a comparatively indefinite period before a new supply of filling need be supplied. The filling 27 is threaded through the tension device 45, thence to the eye 46 mounted in the outer flange 47 of bracket 37. The filling 27 is then threaded through the inner tube 29 to the inserting device, as clearly shown in Figure 16.

The tension device 45 comprises the base bracket 48 which is fastened to a support or the floor by means of bolts 49. This base bracket 48 is provided with an upstanding portion 50 (Figs. 8, 9 and 10). Extending near the upper end of extension 50 are the stationary tension fingers 51. The fingers 51 are provided on the outer ends with a turned down portion 52, and intermediate they are provided with a notch 53. An auxiliary bracket 54 is fastened by screw 55 to the upstanding portion 50 of bracket 48. Auxiliary bracket 54 is suitably insulated from bracket 48. Auxiliary bracket 54 is substantially Y-shape in structure, Figure 8, producing bearing yoke 56. The ends of this yoke 56 form bearings in which rotary pin 57 is mounted. On pin 57 is sleeve 58. Projecting from this sleeve are the tension eye fingers 59. These fingers 59 each have a downwardly extending portion 60 on which is formed eye 61. The end tension finger (Figure 10) has a long downwardly extending portion 62 which is bent at right angles at 63. A collar 64 is fastened at one end of pin 57 and extending from this collar 64 is threaded rod 65. On rod 65 is adjustable nut 66. Fastened to the auxiliary bracket 54 is the electrical lug connector 67 which is held in place by screw 68. Fastened to extension 50 by screw 69 is electrical lug connector 70. Without departing from the spirit and scope of this invention porcelain eyes may be substituted in place of the eyes 61, etc. It will therefore be seen that the filling 27, from cone 43, passes through the wool tension roll 71 (Figure 5), held in a suitable bracket 72, which bracket is fastened to the base bracket 48. From the roll 71 the filling enters the tension device 45 passing under a stationary finger 51 and then through eye 61 of the contiguous finger 59. This sequence of the passing under one and then through the eye of the other tension finger continues until the filling 27 leaves the last tension finger, from which it goes to the eye 46, and then is threaded into the tube 19. Due to the interlacing of the filling between the stationary tension fingers and the rotatable or eye tension fingers 59 and the tendency of the adjustable weight 66 to take up slack on the upper tension fingers, a tension is maintained on the filling 27 which may be adjusted as desired by using more or less of the tension fingers or by adjusting the balance nut 66. Should the tension become too weak, the weight of the balance nut 66 will cause a rotary movement of the top tension fingers 59 to a point where the end of the last one (62) will contact, as shown by dotted lines 63a (Figure 10, the lower extension finger 51 contiguous thereto. This will cause the completion of the electrical circuit, which in turn will cause the loom to stop through the usual method of stop motion control of the warp stop motion. This device will also function similarly should the filling become broken. Of great importance is the fact that every insertion of the filling will be under practically identical tension, thus insuring a perfect filling tension condition which will be reflected in a superior woven fabric.

Referring to Figure 4, the elongated bracket 73 is carried on the upper portion of the right hand end of the loom, being fastened to the lay sword 3 (Figure 1). One end of the operating tube 19 is slidably mounted in the extension 36 of bracket 37 as hereinbefore stated. The tube 19 is slidably mounted in bracket 74 near its opposite end. The bracket 74 is the main bracket for supporting the tube 19, the other tube 19 being supported in similar manner. Tube 19 is slidably mounted in extension 36 when tube 19 is in its outer position, for the tube must be in extension 36 to allow pin 34 to strike against the extension for the purpose hereinbefore specified. Bracket 74 is fastened by bolt 75 to the lay sword 3, and, too, this bolt 75 fastens bracket 73 to the lay sword.

Referring particularly to Figure 18, the scissor 76 comprises the upper blade 77 and the lower blade 78. These blades are mounted on a stud 79 of the oscillating lever 80. This lever 80 is provided with a stud 81 mounted in hub 82. On stud 81 is mounted a second oscillating lever 83. This lever 83 has a downwardly projecting flange 84 in which is mounted the adjustable screw 85; this screw 85 is provided with the usual check nut 86. This oscillating lever 83 is held in position by a spring 87, fastened at one end to the lever and at the other end to the bracket 88. The upper end of this oscillating lever 83 is constructed with a tang end 89, which tang end has slots in its ends through which the end of the upper blade 77 extends. The outer end of the lower blade 78 also extends through tang 89 in the same manner. Spring 90 is fastened between blades 77 and 78 to keep an open tension on the blades and also hold them in their respective slots in tang 89. Oscillating lever 83 has also an upwardly projecting lug 91 in which is mounted the adjusting stop screw 92, provided with a check nut. Lever 80 has a downwardly projecting finger 93 which is held under spring tension by means of spring 94; this spring is connected at one end to finger 93 and at its other end to a downwardly projecting finger 95 of bracket 88. Lever 80 is also provided with a projecting portion 96 which acts as a stop lug for the adjustable screw 97; screw 97 is mounted on the integral lug 98 which extends outwardly from the bracket 88. Bracket 88 is held on frame 1 by means of bolts 99. The illustration in Figure 18 shows the device in position as when the lay has moved toward the front of the loom and is about to operate. The filling has been inserted and the gripping devices have returned to their normal position outside of the shed. The filling has been located in the filling looper 118 (hereinafter specifically described), the looper has rotated out of position from in the shed and the filling is in a position near the end of the looper. The filling inserting jaws 22 (Figure 16) have closed on the filling to grasp the same, however, the retrieving device jaws have not yet opened. This is accomplished by the proper design and timing of the cams 16 (Figure 3), which control the action of the operating levers 9 and the operating tubes 19. As the lay moves further towards the front of the loom, the screw 85 contacts a portion of the moving lay, as indicated by dotted lines 102 (Figure 18). This causes lever 83 to rotate on its stud 81 against the tension of spring 87. As this motion takes place, the extended portion of the shear blades are forced open by the ends of the slotted tang 89 until the tang is approximately at the center of the "handle" ends of the blades of the scissor. This action has caused the scissors to close and cut the filling, thus severing it from its position in the weave and freeing it from the jaws which hold it in position in the warp. Now, if the shears were allowed to remain in this position after cutting the filling, they would be struck by the reed and thus cause damage to the reed. To prevent this condition from existing, any further movement after the cutting has taken place causes the lever 80 and the whole cooperating mechanism to rotate on its lower stud towards the front of the loom against the tension of spring 94, out of position, thus causing the scissors or shears to be moved away from the reed which is free to beat up the pick inserted without any interference from the scissors. This last rotation takes place because after the shears or scissors are closed lever 83 cannot move any farther and so the whole structure rotates around the center of the stud at the bottom, as explained. Now, as the lay reverses, after having beat up the filling, the spring 94, which is under excessive tension causes the whole device to rotate back to the original position where it is stopped when the adjusting stop cam screw 97 contacts the extension 96 of lever 80. Further rearward movement of the lay causes the spring 87 to withdraw or rotate the lever 83 to its original position where it is stopped by contact of the adjustable stop screw 92 contacting with stop lug 103 integral with lever 80. It may be mentioned that spring 94 must be considerably stronger than spring 87 for successful operation of the mechanism. The mechanism is now back in its original position ready for the next pick and a repetition of the operation as outlined.

Figure 20:
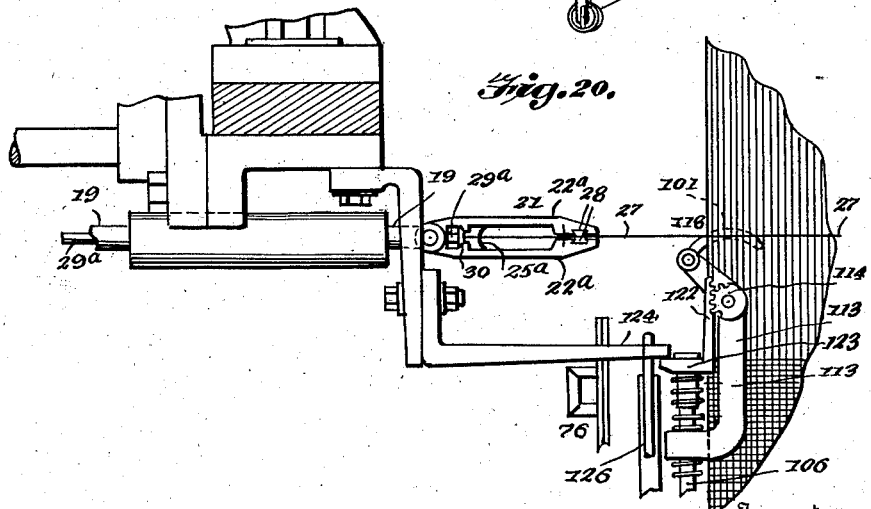
Figure 20 is a top plan view of the same.

Referring to Figures 21 to 25, in which the looping mechanism of my improved loom is shown, a bearing block 104 is fastened to a suitable part of the loom frame by means of bolts 105. A shaft 106 passes through a portion 107 of the bearing block 104 on the upper end of which is collar 108. Shaft 106 has a pin 109 which rides in slot 110 formed in the bearing portion 107. Shaft 106 also has a collar 111 on its lower end, which collar acts as a stop for said shaft. On shaft 106 is mounted a hub shaped piece 112. The under side of hub shaped piece 112 is provided with a downwardly extending portion 112a, dotted lines Fig. 22. Portion 112 is also provided with projection 113 on the outer end of which is a rotatably mounted pinion segment 114. This pinion segment 114 is mounted on pin 115. Underneath pinion 114, and fastened to pinion 114 is arm 116 which rotates with pinion 114. Mounted securely in the end of arm 116 and extending downwardly therefrom is filling looper tube holder 117. At the outer end of holder 117 is mounted the filling looper device 118. Slidably mounted on shaft 106 is sleeve 119. At the outer end of sleeve 119 is secured a collar 120. Collar 120 has an extended portion 121 which has rack teeth 122 meshing with pinion 114. Collar 120 has also an extended portion 123, the purpose of which is to provide a portion of collar 120 which may be acted upon by lever 124 to impart motion thereto. Mounted on shaft 106 and sleeve 119 is coiled spring 125. The function of this spring 125 is to keep 112 and 120 in the position shown in the drawings, until the extended portion 123 is acted upon by lever 124 at 123. Mounted on shaft 106 between the bearing faces of 104 and 112 is the spring 127, the function of which is to keep these units in an extended position, so that shaft 106 is extended to the position shown in the drawings, with collar 111 acting as a stop. Spring 127 must be considerably stronger than spring 125. Extending from the bearing block 104 are two lugs 128 which form bearings for pin 129. On this pin 129 is mounted the hub 130 which has the extended portion 131. A part of extended portion 131 has the hook 132 (Figure 22), which hook is on the upper side of the end of the outwardly extending arm 133. The center of the hooked portion 132 is in line with the center line of the hub 112 on the bottom of which is the pointed portion 134. Hooked portion 132 has a forwardly extending finger 135. The function of finger 135 is to prevent contact between the hook 132 and the spring 127. The lever 131 is provided at one end with a cam unit 132a. Fastened to the lay structure is the arm or lever 124. On the under side of extended portion or lever 131 is mounted a flat spring 136 which is fastened by means of screw 137. The purpose of this spring 136 is to keep lever 131 in proper position. As the lay structure, which carries 124, moves to a more forward position, lever 124 makes contact with collar 120 at 123 of the looping mechanism. This carries the hub 120 on sleeve 119 downward, against the slight tension of spring 125 until it is stopped from further motion on shaft 106, as the face of hub 112 contacts the end of the face of sleeve 119. Shaft 106 has remained stationary as it is held in position by the relatively strong spring 127, acting between the collar 112 and the face of the bearing 104. Collar 111 acts as a stop to prevent the spring 127 from causing any further movement of shaft 106. As hub 120 has moved and with it extension 121, this movement has caused pinion segment 114 to rotate by the effort of the rack teeth in mesh with the pinion teeth. This rotation carries with it the filling looper device 118. As this rotation takes place, the filling which is still under tension, in effect slides around into the end of the device where it is held from falling out by means of the pronged construction 138 on the tube or jaws 101 of said device 118. Note that at this point the looping device is now outside the warp line and clear of the same. Also, that this rotation has been relatively rapid in operation, due to the pinion and rack arrangement. This allows the looper device to move out of position so that the reed does not come in contact with the looper device before it has cleared itself. Figure 21 shows the looper device in its former and inactive or normal position. Figure 20 shows the looper in its most extended position and in the warp as it would be before rotation. Now as the lever 124 moves farther forward, it carries with it hub 120. Inasmuch as hub 120 is mounted on sleeve 119, the spring 125 has been contracted and there can be no further action of said spring because sleeve 119 is against hub 112, hub 112 is compelled to take any further movement, which it may, by causing shaft 106 to slide in its bearing portion 107 of bearing block 104. This movement causes spring 127 to be contracted. Cam surface 139 on projection 126 of the lever 124 acts upon the cam surface of lever 131, causing the latter to be forced in a downward direction, thus assisting hook portion 132 to escape its locking point, at 134, on the hub 112. At such time when there has been sufficient movement to cause the cam shaped surfaces 139 and 139a to become disengaged, it will be noted that locking point 134 of lever 131 prevents said lever from rotating in an upward direction by the action of spring 136, because it contacts and slides along the lever. This condition prevents any interference between the hooked portion 132 and any other part of the mechanism with which it might otherwise interfere.

During the latter part of the motion, the filling 27 has been moved up to a position near the apex (or fell, in velvet) of the warp threads, and it has also been cut by the cutting device at each end, thus releasing it from the carrier jaws and allowing them (the jaws) to move to a more forward position than that assumed by the reed when in the beat up position. This is necessary because the centerline of the operating tube and gripping devices is slightly in advance of the front face of the reed, which is a necessary condition to allow the jaws to operate (open and close) at the time of transfer of filling thread near the center of the weave without damage to the reed through contact therewith.

Now, as the lay reverses its movement sufficiently and carries the lever 124, the hook 132 engages the downwardly extended portion of hub 112. This prevents the device from moving as a unit any further. Note that the cam surfaces 139 and 132 have not yet contacted each other. The idea of this movement is to allow the looper to be moved up to a position where it may be turned into the shed, and also allow time for the shed to open sufficiently to allow clearance therein for the looper to enter. Of course, the shed is closed after the loose end of the filler has been turned in with the next pick.

The mechanism is now in position to execute the looping operation and that is accomplished in the following manner. It should be noted that the pick, the ends of which are now in the jaws of the looper device (Figs. 21 and 22), has been bound in, as the warp threads have changed since its insertion and it has been beaten up by the reed in the lay. This means that when the looper device operates, it will be inserting the ends of mentioned pick in the shed opening formed to receive the succeeding pick. In other words, the ends are not turned into the opening of the same pick, but into the opening existing for the subsequent pick.

As lever 124 moves further, it allows hub 120 on sleeve 119 to move with it, due to the action of spring 125. This movement takes place because the hooked condition of hook 132 prevents the unit from moving as a whole, as hub 120 moves with sleeve 119 away from hub 112, through the effort of spring 125 on shaft 106. This causes rotation of the pinion 114 in an opposite direction from its previous rotation, causing the looper device 118 to rotate back into the position shown in Figure 21. During this motion, it has carried the free end of the filling into a position between the warp threads.

It will be noted that cam shaped surface 139 in connection with the cam face of unit 132a have contacted and acted to partially disengage hook 132 and slightly more movement will allow this hook 132 to become totally disengaged and thus allow the mechanism to move further as a whole unit to its initial position, as shown in Figure 21, during which forward movement it will have released any short end of filling remaining in the looper jaws 118, and will then be in position to receive the next pick and repeat the cycle as hereinbefore explained for the next pick.

It is to be understood that the cutting as well as the looping operations are performed at both sides of the weave by similar devices as above described for these operations, opposite hand units being necessarily used.

In the interest of simplicity, all of the parts of the loom have not been illustrated as any one versed in the art is familiar with the construction of the same. I have illustrated my invention as a single shed application. However, it is not intended to limit the scope of this invention to this extent, as more than one set of gripping devices may be operated simultaneously, as would be required in the case of multiple shed weaving.

From the foregoing, it will be noted that the inserting of the filling in the manner specified is governed by the movement of the inserting and retrieving devices, through the action of cam and lever units. This motion is so designed that it is favorable in all respects to a desirable tension condition of the inserted filling. That is, the gripping devices have a relative slow but increasing speed up to the center of the maximum amount of movement and then a decreasing speed to the point of a maximum throw. The same action takes place through the reversal path of the cycle necessary to complete the insertion of the weft or filling. At the point of transfer of the filling from the inserting device to the retrieving device—which point is the interlocking position of these devices—the movement is at its slowest speed, this presenting a most favorable condition for transfer. This transfer also takes place from just before until just after back center of crank shaft position, at a time when lay motion is at its minimum speed of motion. In fact, the center of the position of transfer may be at a time when the lay is reversing.

The feature of having two gripping devices, meeting near the center of the weave, is very important and distinct; in fact, it places this system of shutterless loom operation in a position of great advantage and superiority over any where only one carrier is available, in that the speed of operation of the gripping devices may be cut in two with respect to the speed of a one-carrier system. This makes it possible to increase the speed of the loom operation with respect to jaw operating speed which is of unquestionable value.

It is also to be understood that in accordance with this invention a single thread is carried through the shed and placed in position and not released until near the beating up position. The ends of the filling after being cut or released from the jaws are turned back into the selvage of the following pick, thus leaving the selvage with a favorable edge as well as reinforcing the edge and looping the same so that temples of the inserted type may be used if so desired. This feature also prevents any possibility of ravelling at the edge.

While I have described the preferred embodiment of my invention and have illustrated the same in the accompanying drawings, certain changes or alterations may appear to one skilled in the art to which this invention relates during the extensive manufacture of the same and I, therefore, reserve the right to make such changes or alterations as shall fairly fall within the scope of the appended claims.

What I claim is:

1. In a shuttleless loom, the combination with a support, of operating tubes on said support, a pair of gripping devices on the inner ends of said tubes, each gripping device comprising a pair of hinged jaws, a spring between and fastened at its ends to the jaws of each pair, gripping blocks on the jaws of each pair, and means for operating said tubes.

2. In a shuttleless loom, the combination with a support, of slidable operating tubes on said support, a filling inserting gripping device on the inner end of one tube, said gripping device comprising a pair of pivoted jaws provided at their outer ends with bevelled portions and with gripping blocks, a retrieving gripping device on the inner end of the other operating tube, said last mentioned gripping device comprising a pair of jaws provided near their outer ends with gripping blocks and with bevelled portions, means for operating said tubes, whereby the jaws of the gripping devices travel over their bevelled portions during movement to an interlocking position and to a separation from the said interlocking position.

3. In a shuttleless loom, the combination with a support, of movable tubes on said support, gripping devices on the inner ends of said tubes, each gripping device comprising hinged jaws, cam means between the jaws of each gripping device, means carried by said tubes for operating said cam means, whereby the jaws are opened and held in an opened position, and means for operating said movable tubes upon said support.

4. In a shuttleless loom, the combination with a support, of sliding tubes upon said support, gripping devices on said tubes, each gripping device comprising a pair of jaws, a cam unit between the jaws of each pair, an inner tube within each sliding tube and connected to a cam unit, springs within said sliding tubes and around said inner tubes exerting pressure upon said inner tubes in one direction, means for releasing said inner tubes when the cam units are in a set position, whereby the respective jaws of each gripping device can close together, and means for sliding said slidable tubes.

5. In a shuttleless loom, the combination with a support, of operating tubes on said support, gripping devices on the inner ends of said tubes, each gripping device comprising a pair of jaws, a cam plug slidably mounted between the jaws of each pair, an inner tube connected at its inner end to said cam plug, a plug provided with a pin secured to said inner tube near its outer end, said pin extending through the side of the operating tube, yieldable means within said operating tube and pressing against the plug near the outer end of the inner tube, said pin adapted to engage a portion of said support for moving said cam plug to an unset position, and means carried by said support for imparting movement to said operating tubes.

6. In a shuttleless loom, the combination with a support, of movable operating tubes on said support, gripping devices on the inner ends of said tubes, each gripping device comprising a pair of pivoted jaws, a spring between the jaws of each pair and having its ends secured to said jaws, whereby the jaws are normally held in a closed position, a cam plug slidably mounted between the jaws of each pair and being capable of holding the jaws in an open or set position, means for operating said cam plug, and means on said support for imparting movement to said movable operating tubes.

7. In a shuttleless loom, the combination with a support, of operating tubes movably mounted on said support, a pair of jaws hingedly mounted on the inner end of each operating tube, cam means slidably mounted between the jaws of each pair, movable means in each operating tube and fixedly connected to the cam means, whereby the cam means is operated to open the jaws, means for operating said movable means for releasing the jaws and permitting same to close, and means for operating said operating tubes.

8. In a shuttleless loom, the combination with a support, of a pair of aligned hollow tubes on said support, a pair of jaws pivotally mounted at their inner ends upon the inner end of each of said hollow tubes, cam means slidably mounted between the jaws of each pair, movable means in each hollow tube and fixedly connected at its inner end to said cam means, whereby the cam means is operated for moving the jaws, and means for operating said hollow tubes and movable means therein.

9. In a shuttleless loom, the combination with a support, of operating tubes slidably mounted on said support, each operating tube provided with a plug extending from its inner end, a pair of jaws hingedly mounted at their inner ends on each plug, means normally holding the jaws of each pair in a closed position, a tube within said operating tube and provided on its inner end with means for opening the jaws, means for operating said last-mentioned tube, and means for operating said operating tubes.

10. In a shuttleless loom, the combination with a support, of operating tubes movably mounted on said support, said operating tubes provided with plugs extending outwardly on their inner ends, a pair of jaws pivotally mounted at their inner ends on the outer end of each plug, a secondary tube within the operating tube and extending through a plug and in between the jaws of each pair, means on said secondary tube between the jaws for operating same, and means on said support for imparting movement to said operating tube.

11. In a shuttleless loom, the combination with a support, of operating tubes on said support, each operating tube provided on its inner end with a pair of pivotally mounted jaws, said operating tube provided with means extending through the pivot of said jaws for operating the jaws to open the same, and means on said support for imparting movement to said operating tubes.

12. In a shuttleless loom, the combination with a support, of operating tubes slidably mounted on said support, each operating tube provided with a plug threaded into its outer end, each plug provided with a pair of jaws hingedly mounted on its outer end, a secondary tube in each operating tube and extending through a plug and having one end positioned between two jaws, means on said secondary tube between the jaws for moving the same when said secondary tube is moved in one direction, a collar within said operating tube and on said secondary tube, a plug within said operating tube and secured to said secondary tube, said last-mentioned plug provided with a pin extending beyond the side of said operating tube, a spring on said secondary tube between its collar and plug, means for operating upon the pin for forcing the secondary tube in one direction, and means for operating said operating tubes.

13. In a shuttleless loom, the combination with a support, of lay swords upon said support, elongated horizontal brackets attached to said lay swords, brackets provided with slidable operating tubes on said lay swords and registering with said elongated brackets, said operating tubes provided with gripping means on their iner ends, said operating tubes provided with means for operating said gripping means, said elongated brackets provided with extensions adapted to be engaged by portions of said gripping-means operating means, and means carried by said support for operating said operating tubes.

14. In a shuttleless loom, the combination with a support, of lay swords, elongated brackets extending outwardly from said lay swords, sliding operating tubes on said lay swords in alignment with said elongated brackets, said operating tubes provided on their inner ends with cooperating gripping means, said elongated brackets provided near their outer ends with extensions, gripping-means operating means carried by said operating tubes and being adapted to engage said extensions during part movement of said operating tubes, and means for imparting movement to said operating tubes.

15. In a shuttleless loom, the combination with a support, of lay swords on said support, elongated brackets provided with extensions fastened to said lay swords, operating tubes slidably mounted on said lay sword at the inner ends of said elongated brackets and being in horizontal alignment with said brackets, said extensions provided with means for allowing said operating tubes to pass therethrough, said operating tubes provided on their inner ends with gripping means, said operating tubes provided with means for operating said gripping means when said operating tubes are in said extensions, and means for operating said operating tubes.

16. In a shuttleless loom, the combination with a support, of slidable operating tubes on said support, pairs of jaws on the inner end of said operating tubes, each pair of jaws pivotally mounted only at their inner ends upon the inner end of an operating tube, said operating tube provided with cam means for opening the jaws, during movement of the operating tube, the jaws of each pair being provided with means near their center for normally holding the jaws in a closed position, and means for imparting movement to said operating tubes.

17. In a shuttleless loom, the combination with a support, of slidable operating tubes upon said support, each operating tube provided on its inner end with jaws rigid throughout their length, said jaws of each operating tube being pivotally mounted at its inner end, means for passing a filling through the pivot of each pair of jaws, means passing through the pivot of each pair of jaws and provided with means between the jaws for operating the same in one direction, means between the jaws of each pair for normally holding same in a closed position, and means for operating or imparting movement to said operating tubes.

WOODRUFF T. SULLIVAN.